United States Patent [19]

Farr

[11] Patent Number: 5,751,863
[45] Date of Patent: May 12, 1998

[54] METHOD AND SYSTEM HAVING RELAXED FRONT END DISTORTION REQUIREMENTS

[75] Inventor: Mina Farr, Palo Alto, Calif.

[73] Assignee: Hewlett Packard Company, Palo Alto, Calif.

[21] Appl. No.: 665,437

[22] Filed: Jun. 18, 1996

[51] Int. Cl.$^6$ .............. G06F 9/40; G06T 5/00; H04N 1/409

[52] U.S. Cl. .............. 382/275; 358/463; 348/241

[58] Field of Search ............ 382/275, 254, 382/260, 266, 263, 321; 358/463, 447, 471, 474, 482, 483; 348/241, 252, 335; 359/708, 656

[56] References Cited

U.S. PATENT DOCUMENTS

| | | | |
|---|---|---|---|
| 3,583,789 | 6/1971 | Brighton | 359/656 |
| 5,216,545 | 6/1993 | Saito | 359/708 |
| 5,276,519 | 1/1994 | Richards et al. | 382/275 |
| 5,353,056 | 10/1994 | Westerink et al. | 348/263 |

*Primary Examiner*—Scott A. Rogers
*Attorney, Agent, or Firm*—Timothy Rex Croll

[57] ABSTRACT

In a design of an optical arrangement for a digital imaging system, optical elements are selected and arranged based upon achieving low levels of aberrations other than distortion, with a distortion level of 5% or greater being introduced by sacrificing distortion-free imaging to achieve such low levels. The distortion of the optical arrangement is characterized and then identified to a digital image processing system, allowing the distortion that is introduced at the optical level to be corrected at the processing level. The approach is to provide front end image shaping that sacrifices distortion-free imaging to control other aberration contributions and then to provide back end digital reshaping to substantially correct the distortion. The identification of front end and back end shaping and reshaping is made with reference to a digitizing sensor that provides the image raw data. In one embodiment, the sensor is a two-dimensional array of sensor elements.

16 Claims, 4 Drawing Sheets

1

METHOD AND SYSTEM HAVING RELAXED FRONT END DISTORTION REQUIREMENTS

TECHNICAL FIELD

The invention relates generally to digital imaging systems and more particularly to the design of an optical system for digitally capturing an image.

BACKGROUND ART

Digital imaging is utilized in a wide variety of applications. Various types of microscopes capture images of objects on a digitizing image sensor, allowing the captured image data to be manipulated and displayed. During laproscopic surgeries, the images of internal organs are captured by small imaging optics of endoscopes, and are displayed on a monitor for viewing by the performing surgeon. In another example of the application of digital imaging, scanners are used extensively to obtain a digital image from a printed form or from a photographic film for display on a computer monitor and/or for further image manipulation. Images of two-dimensional or three-dimensional objects can be directly obtained by the use of digital cameras.

In each of these applications of digital imaging, a digitized raw image is acquired and is immediately accessible for processing. The processing may be implemented in any of a variety of approaches before a final image is formed. An array of image processing routines may be executed prior to viewing the final image.

Digital imaging may be broken down into three main components. The first component is the optical arrangement for imaging an object or objects of interest. This image is directed onto a sensor, which is the second main component. The sensor provides the digitized raw image. The sensor may be a charged coupled device (CCD) having a two-dimensional array of sensor elements, but other digital sensors are known. The third main component is the digital image processing system that manipulates the digitized raw image to form the final image. This third component may include a monitor, a printer, or an analytical device that provides information related to the imaged object or objects.

At each of the three component levels, the goal of the designer or programmer is typically to maintain the accuracy of the image of the object or objects. For example, at the optics level, one goal is to minimize the degradation caused by aberrations of the optical system. Primary aberrations are sometimes referred to as "Seidel Aberrations" and include astigmatism, coma, Petzval curvature, distortion and spherical aberration. Astigmatism refers to the condition wherein the focal length for one plane of rays perpendicular to the focal plane is different than that for the mutually orthogonal plane. Coma refers to the situation wherein rays from a single point in the object plane converge to different points in the image plane, depending upon where the rays pass through the aperture. Distortion is a variation of the effective magnification of an optical system as a function of position in the image plane. Petzval curvature refers to the situation where the surface of proper focus is a curved surface, rather than the image plane. A simplified definition of spherical aberration is a variation of focus with aperture. The magnitude of spherical aberration therefore depends upon the height of a ray.

When an off-axis point's image falls at a point closer or further away from the optical axis than the same point's image by the paraxial rays, the image is said to have distortion. The amount of distortion is the transverse distance between the actual image point and the paraxial image point. This displacement is usually measured in terms of the percentage of displacement with respect to the position of the paraxial image point from the optical axis. The displacement usually varies as the cube of the distance from the axis. Thus, for a square object, corners of the object will be distorted $2\sqrt{2}$ as much as the center of the sides of the object. In the case where the image points move further away from the optical axis, the corners of the image appear to be pointed outwardly. This phenomenon is called pincushion distortion and the magnitude is a positive percentage. On the other hand, when the image points move inwardly from the correct position, the corners of the image are more rounded. This phenomenon is referred to as barrel distortion and the magnitude is a negative percentage. Other aberrations include chromatic aberrations.

The designer of an optical system for a digital image application often must select a balance between correction of the different aberrations. That is, there is a tradeoff between corrections of aberrations. For example, correction of astigmatism often introduces or increases field curvature. Coma is particularly difficult to correct, since it is non-symmetrical.

Inaccuracies in imaging may also occur at the sensor level. As noted in U.S. Pat. No. 5,353,056 to Westerink et al., misregistration of an image may occur because separate CCD arrays are inconsistently aligned. If the CCD arrays are not properly aligned, the different light images will be sampled at different spatial positions. This misregistration of the sampled images causes color edges in the combined images to appear at different positions. The patent also teaches that there can be an electronic correction for chromatic aberration and geometric distortion in an image caused by the lens system and skew among the images caused by misalignment of the different color image sensors. Sampled data signals are first interpolated across either the rows or columns of an image and then across the columns or rows of the image to change the magnification and registration factors of the images represented by each of the sampled data signals from the respective color image sensors. The changes to the magnification and registration factors are to provide a consistent magnification function across the image that is substantially equal to a desired magnification function.

The Westerink et al. patent is consistent with the conventional approach of maximizing image quality within manufacturing constraints (e.g., cost and/or complexity) at each of the three component levels of the overall system. While Westerink et al. provides advantages over many prior art techniques, further improvements are available.

What is needed is a digital imaging design approach and an imaging system that provide an enhanced final image without a corresponding increase in cost/complexity.

SUMMARY OF THE INVENTION

The imaging system divides the assignments of correcting aberrations between pre-sensor optics and post-sensor digital processing. The optical arrangement is selected to provide a "best enhanceable image" to a sensor, rather than to provide an aberration-free image to the sensor. In a preferred embodiment, the optical arrangement maintains a tight balance among the various forms of sharpness-related and resolution-related aberrations, other than distortion. Distortion is introduced as a result of design corrections for reducing other aberrations. the distortion characteristics of the optical arrangement are identified. The distortion typically exceeds five percent. Distortion compensation is then achieved at the processing level.

At the optics level of the imaging system, aberrations such as astigmatism, coma, chromatic aberrations, Petzval curvature, and spherical aberration are balanced. This balancing includes tradeoffs in the reduction of one form of aberration to the increase of another form. However, distortion considerations are reduced in significance and are preferably disregarded. Therefore, optical design is carried out in the absence of tradeoff considerations related to distortion.

For most applications, distortion levels greater than two percent are unacceptable. The invention includes pre-sensor imaging to exceed this value, but reduces distortion to a low level by providing the post-sensor processing. Digital image processing is well suited for distortion corrections. This is particularly true where distortion defects are consistent throughout a field of view of an optical system. The task is further simplified by identifying the distortion characteristics of the optical system to the digital image processing system. As previously noted, the distortion level imposed by the optical element will typically exceed five percent. In some applications, the image displacement introduced by optical distortion exceeds ten percent of paraxial image height of an image formed by the optical arrangement. However, this high level of distortion can be offset at the post-sensor processing to provide a final image having a distortion level that is preferably less than one percent.

The optical arrangement may be considered to be a pre-shaping system that introduces substantial distortion as a sacrifice to offsetting other forms of aberrations. In a subsequent step, the images captured by a sensor, such as a CCD array, are digitally corrected to remove the substantial distortion. An advantage of the invention is that the relaxation of distortion correction at the pre-sensor level allows a fewer number of optical surfaces to be used, while achieving the same degree of final-image quality of the overall system. The reduced number of optical surfaces translates into fewer elements, so that the cost of the imaging system is reduced without a loss of performance. Alternatively, enhanced performance can be achieved without increasing the cost of the overall system. Relatedly, since controlling distortion conventionally has been a significant factor in determining the limitations of wide angle optical arrangements, relaxing the distortion correction requirements allows wider angle arrangements to be utilized.

BEST MODE FOR CARRYING OUT THE INVENTION

Figure 1:
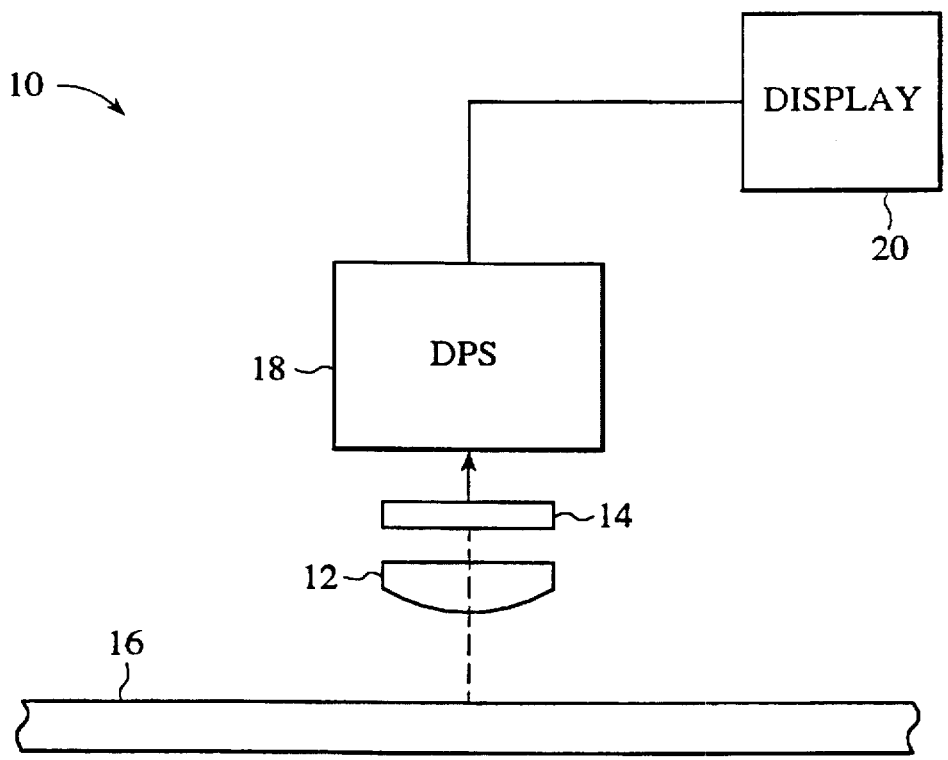
FIG. 1 is a schematical representation of a digital imaging system of the type that can be used with the present invention.

With reference to FIG. 1, a digital imaging system 10 is shown as including optics 12 having an optical axis aligned with the sensor 14. Utilizing the optics 12 and the sensor 14, a digitized raw image of a portion of a surface 16 of interest can be captured. As will be explained more fully below, the optics 12 represent a number of optical elements that are designed with the goal of maintaining a tight balance among sharpness-related and resolution-related aberrations, other than distortion.

The surface of interest 16 may be a document that is to be scanned into computer memory, but the invention may be used in other applications. For example, the method and system that are designed and implemented in accordance with the invention may be used in such applications as surgical imaging, microscope analysis, and wide-scene viewing.

The sensor 14 generates digitized raw data representative of light that is directed onto the sensor by the optics 12. The digitized raw data may be sets of discrete samples or may be captured in continuous time. In one embodiment, the sensor is a CCD array that is used to provide a grid pattern of quantized sample values at selected intervals. Thus, a numerical representation of the image is formed.

Signals from the sensor 14 are input to a digital processing system 18. The signals are manipulated according to preselected operations. The operations may take a pixel-by-pixel approach or may be global. A final image is then provided at display 20. The display may be a computer monitor or printer, but this is not critical. In some digital imaging applications, the "final image" is a printout of data that is used for analytical purposes. For example, there may be a display of pixel-value differences between two images formed at different sampling times.

Conventionally, each of the various components of the imaging system 10 is designed to maximize image restoration accuracy. That is, the conventional approach is to minimize all aberrations introduced by the optics 12, so that a relatively defect-free image is presented to the sensor 14. However, correcting one form of aberrations often increases the level of another form. As a result, there are typically tradeoffs that are made during the design of an optical system. Tradeoffs are also encountered at the other components of the imaging system.

Figure 2:
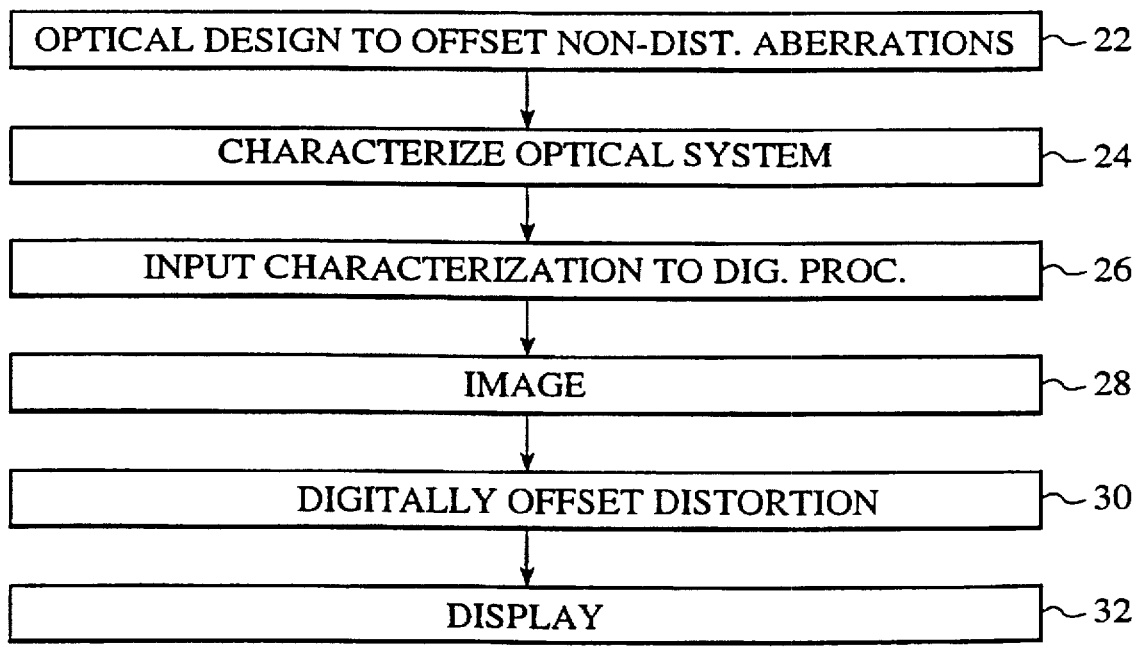
FIG. 2 is a block diagram of steps for implementing the invention with the system of FIG. 1.

In comparison to the conventional approach, the approach represented by the steps of FIG. 2 is to design the optical system while taking the strengths of digital imaging processing into consideration. Distortion is one of the more difficult aberrations to correct at the optics level, but uniform distortion is relatively easily corrected at the digital processing level. This is particularly true if the characteristics of the optical system are input to the digital processing system 18. By defining the exact amount of displacement for each of the radial field positions of a digitized image from the sensor 14, distortion correction can take place at the operations of image processing. By relaxing the tolerance of image distortion at the optics level, lens design is somewhat simplified, especially for large aperture systems. Wide angle lenses are then made more obtainable, since distortion is one of the main limiting factors in the design of wide angle lenses.

In a first step 22 of FIG. 2, the optical system is designed to offset at least some of the forms of aberrations other than distortion. Typically, the implementation of step 22 will result in a distortion level in the range of five percent to ten percent. However, the distortion level may exceed ten percent in some applications. The aberrations that are primarily considered in the design of the optical system 12 may include astigmatism, coma, spherical aberrations, Petzval field curvature, and chromatic aberrations.

In step 24, the optical system is characterized. This may include only the identification of the distortion level. When an off-axis point's image falls closer or further from the optical axis than the point's image by the paraxial rays, the image is referred to as being "distorted." The amount of distortion is the transverse distance between the actual image point and the paraxial image point. This displacement is usually measured in terms of percentage displacement with respect to the position of the paraxial image point from the optical axis. The displacement usually varies as the cube of the distance from the axis. Thus, for example, a square object has corners that are distorted $2\sqrt{2}$ times more than the center of an edge of the image. For a situation in which the image points move further away from the optical axis, the corners of the image appear to be pointed outwardly in what is called pincushion distortion. By convention, pincushion distortion is associated with a positive distortion level. On the other hand, when the image points move inwardly from the correct position, the corners are more rounded and the distortion is referred to as barrel distortion. Barrel distortion is associated with a negative distortion level.

The characterization of the optical system properties is input to the digital processing system 18 at step 26. This facilitates distortion compensation at the digital image processing system level. While the distortion introduced by the optical system 12 is preferably algorithm predictive throughout the image, this is not critical since the input of the characterization data to the digital processing system allows the distortion to be offset even when it is irregular across the field of view of the optical system.

In step 28, the sensor 14 is used to capture an image of the surface of interest 16. In some applications, it may be necessary to increase the size of the sensor or to increase the magnification factor of the optical system 12 relative to conventional implementations, since the "pre-shaping" that is provided by the optical system might otherwise result in a loss of imageable sensor pixels. Raw image data from the sensor is input to the digital processing system 18. A number of operations may be executed at the digital processing system. A required operation is to offset the distortion introduced at the optics level. The step 30 of digitally offsetting distortion is shown in FIG. 2. A step 32 of displaying the final image may be executed immediately, but this is not critical.

EXAMPLE

Figure 3:
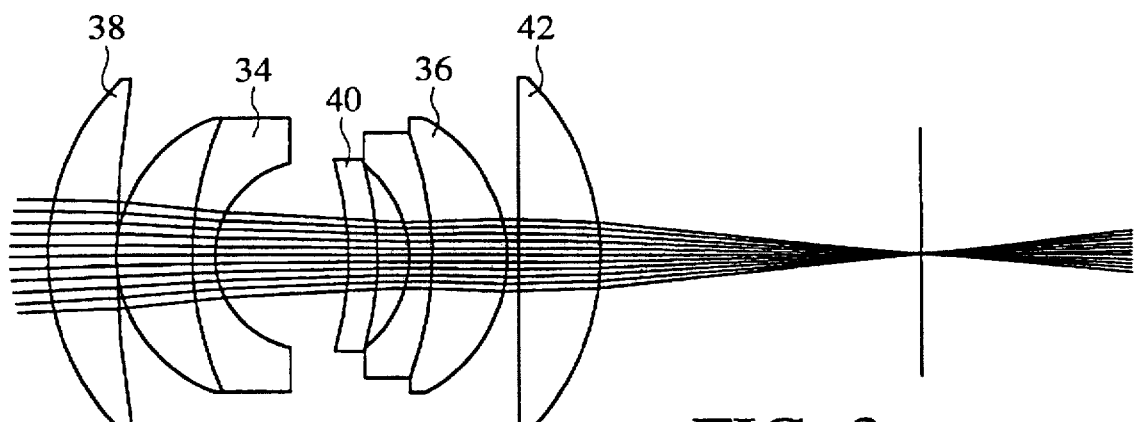
FIG. 3 is a prior art optical system designed using conventional lens design goals.

The benefits of relaxing distortion tolerances at the optical system level can be best demonstrated by providing an example. In FIG. 3, a prior art wide angle lens system is shown as including two doublet lenses 34 and 36 and three singlet lenses 38, 40 and 42. The system is similar to the one described in U.S. Pat. No. 2,975,673 to Mandler, which is designed for conventional cameras. The performance was analyzed at f/3.5, even though the lens was rated at f/1.4. Since a digital sensor camera counterpart probably has a smaller lens system, due to a smaller detector format that inherently lends itself to smaller aberrations, the lens system was scaled to the same format as a digital sensor in order to provide a fairer comparison. The focal length=11 and the numerical aperture=0.1429.

Figure 4:
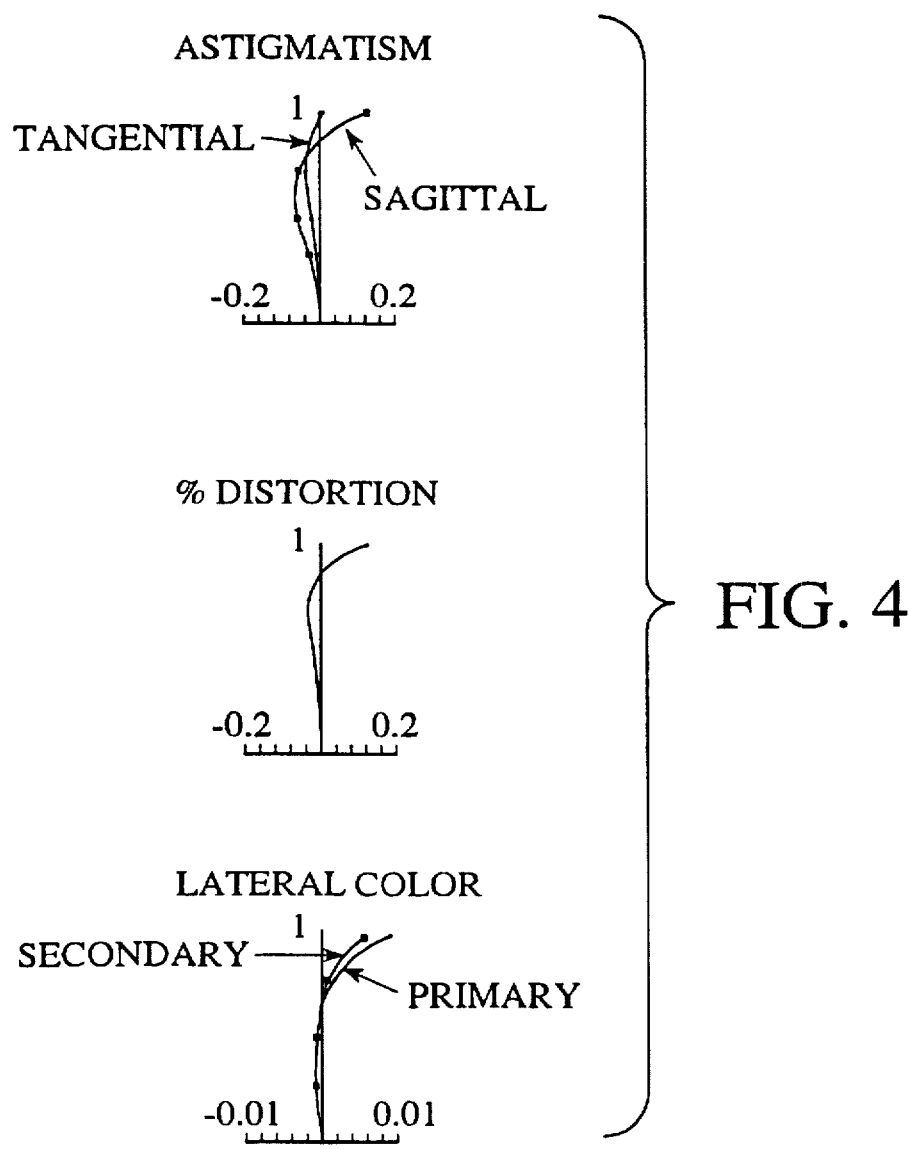
FIG. 4 is a graphical illustration of the astigmatism, distortion and lateral color characteristics of the optical system of FIG. 3.
Figure 5:
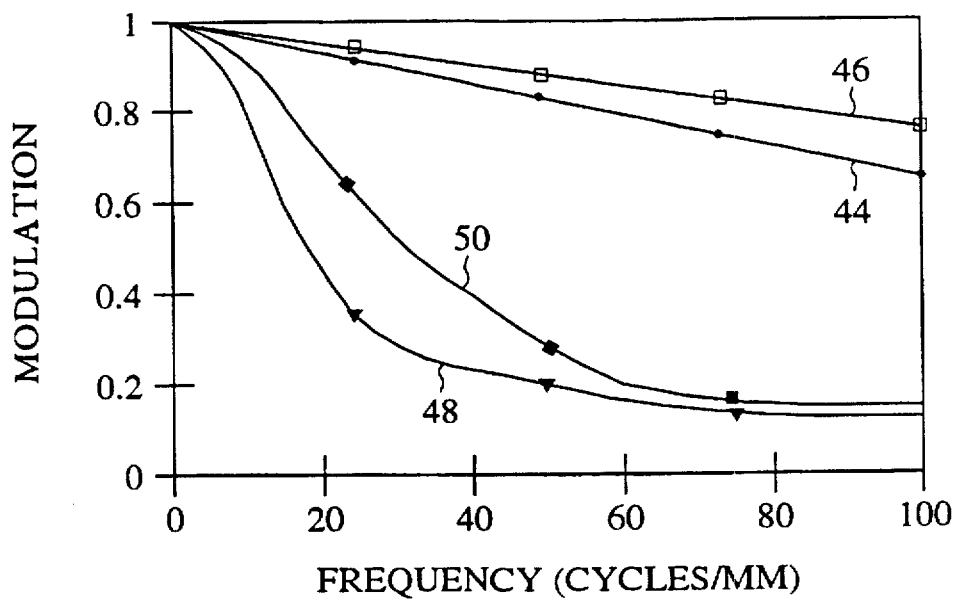
FIG. 5 is a graphical representation of modulation transfer functions for the prior art system of FIG. 3.

Using ray trace analysis, certain aberration characteristics of the system of FIG. 3 were determined. These characteristics are shown in FIG. 4. Real chief rays were traced from a series of object points and the resultant image surface data were then compared to the corresponding paraxial data. In the graphs of FIG. 4, the ordinate in the graphs represents the fractional object height ranging from 0 for on-axis to 1 at the field periphery. As seen from the distortion curve, the optical system is well corrected with respect to distortion for all field points. The maximum distortion level is less than two-tenths percent. However, the modulation transfer function (MTF) of FIG. 5 shows that the lens performance is close to diffraction limit, i.e. the ideal, only for an on-axis curve 44. The "ideal" is represented by curve 46. Also shown are a 0.7 field curve 48 and a full field curve 50. The full field fifty percent MTF is achieved at only 20 cycles/mm.

Calculations were formulated regarding correction of certain third-order Seidel aberrations. The calculation for spherical aberration was −0.004692. The calculation for coma was 0.001961. The calculation for astigmatism was 0.018577. The calculation for Petzval field curvature was −0.075570. Finally, the calculation for distortion was −0.010748.

Figure 6:
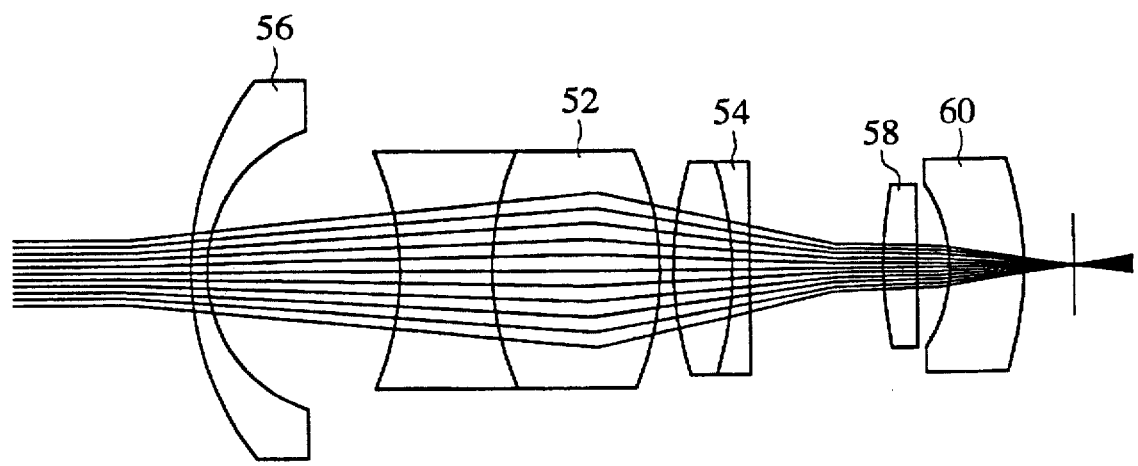
FIG. 6 is a side view of an optical system having relaxed distortion requirements, in accordance with the approach of FIG. 2.

FIG. 6 is an optical system designed in accordance with the invention. The optical system is a wide angle lens design with the same field angle (62 degrees) and format as the optical system of FIG. 3. However, the goal was to balance a number of forms of aberrations without any consideration for minimizing distortion. The lens system includes two doublet lenses 52 and 54 and three singlet lenses 56, 58 and 60.

Figure 7:
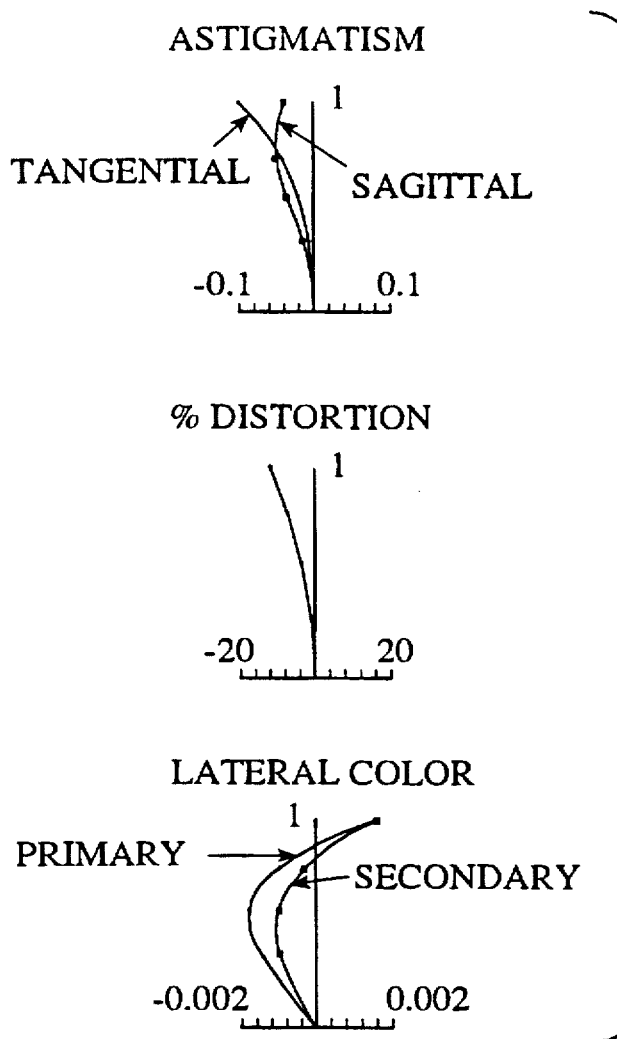
FIG. 7 is a graphical representation of the astigmatism, distortion and lateral color characteristics of the optical system of FIG. 6.
Figure 8:
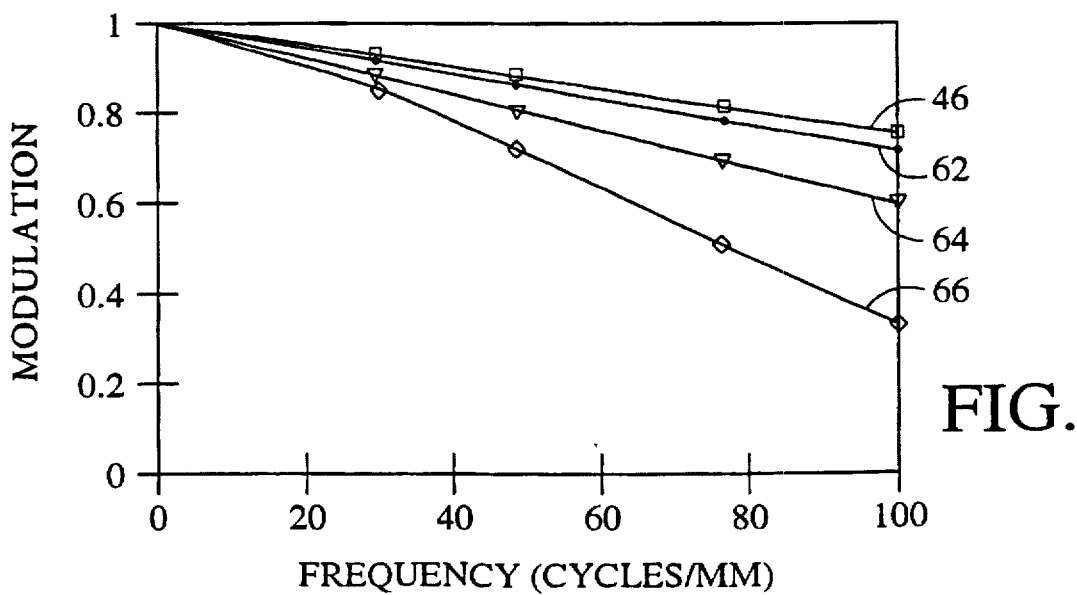
FIG. 8 is a graphical representation of modulation transfer functions for the optical system of FIG. 6.

Ray trace analysis is provided for the f/3.5, 62-degree field optical system of FIG. 6. The graphs are shown in FIG. 7. Since distortion is not taken into account as a performance criteria for the lens system, the distortion level is much greater than that of the system of FIG. 3. The distortion level reaches approximately ten percent for the system of FIG. 6, while the distortion level did not reach two-tenths percent for the prior art system of FIG. 3. However, measures of other third-order Seidel aberrations were significantly lower for the system of FIG. 6. Spherical aberration was −0.003029. The measure of coma was −0.001582. The measure of astigmatism was 0.004861. Petzval field curvature was measured at −0.021771. Distortion was measured at −0.892056. With the exception of distortion, aberrations were reduced to lower levels without an increase in complexity, i.e. an increase in the number of optical elements. As can be seen in the graphs of FIG. 7, both astigmatism and lateral color are smaller for the lens system of FIG. 6, which was designed in accordance with the principles described with reference to FIG. 2. The improvement can be demonstrated more effectively using the MTF graph of FIG. 8. Of course, the "ideal" curve 46 is identical to that of FIG. 5. For each of the on-axis curve 62, the 0.7 field curve 64 and the field curve 66, significant improvements are demonstrated, relative to the curves of FIG. 5.

The distortion evidenced in the distortion graph of FIG. 7 can be corrected at the digital image processing level, as explained with reference to FIGS. 1 and 2. An advantage of this approach is that a simpler optical system can be utilized without a loss in overall performance of an overall digital imaging system. Since lens simplification typically translates into a less expensive optical system, the approach of FIG. 2 partially offsets the tradeoff between cost and overall system performance. Alternatively, the approach can be used to enhance performance without increasing the cost of the system. Moreover, wide angle lenses are more obtainable, since distortion is one of the main limiting factors in the design of wide angle lenses.

I claim:

1. In a design of optics for use in a digital image processing system, a method comprising steps of:

selecting an arrangement of optical elements based upon achieving low levels of aberrations other than distortion, including defining said arrangement such that a distortion level of at least five percent is introduced by sacrificing distortion-free imaging to achieve said low levels of aberrations other than distortion; and characterizing distortion of said arrangement of optical elements such that said distortion can be offset in providing digital image processing of images captured via said arrangement.

2. The method of claim 1 wherein said step of selecting said arrangement of optical elements includes selecting said optical elements in the absence of a trade-off between minimizing distortion and minimizing aberration contributions of astigmatism, coma, Petzval field curvature and spherical aberration.

3. The method of claim 1 wherein said step of selecting said arrangement of optical elements includes defining said arrangement such that image displacement that is introduced by distortion reaches at least ten percent of paraxial image height of an image formed via said arrangement.

4. The method of claim 1 wherein said step of defining said arrangement is carried out such that at least a five percent distortion level is introduced by optically correcting for at least two types of aberrations other than distortion.

5. A method of forming digital images comprising steps of:

providing a sensor for forming digital image data representative of an image directed onto said sensor;

shaping images presented to said sensor to include substantial distortion as a sacrifice to offsetting other forms of aberrations, including selecting an optical system to achieve such shaped images; and digitally correcting said shaped images within a digital image processing system connected to receive signals from said sensor, including reshaping said shaped images to substantially correct said substantial distortion.

6. The method of claim 5 wherein said step of shaping said images includes designing said optical system in an absence of a trade-off between minimizing distortion and minimizing aberration contributions of astigmatism, coma, Petzval field curvature and spherical aberration.

7. The method of claim 5 wherein said step of providing said sensor includes positioning an array of sensor elements relative to said optical system to sample images presented via said optical system.

8. The method of claim 5 wherein said step of shaping images includes introducing a distortion level of at least five percent to images presented to said sensor.

9. The method of claim 8 wherein said step of digitally correcting said shaped images includes reducing said distortion level across a field of view of said sensor such that said reduced distortion level is less than one percent.

10. The method of claim 5 further comprising steps of characterizing said substantial distortion across a field of view of said sensor and identifying said characterization to said digital image processing system for reshaping said shaped images.

11. The method of claim 10 wherein said step of characterizing said substantial distortion includes quantifying displacement of digital sampling points of data of said sensor relative to paraxial image points of a true image that is sampled.

12. The method of claim 5 wherein said step that includes selecting said optical system is a step of designing said optical system to present optically shaped images that facilitate enhancement via digital processing.

13. An imaging system comprising:

sensor means for forming digital image data representative of an image received at said sensor means;

an optical arrangement having optical elements arranged to define optical properties which impose a distortion level of at least five percent while other aberration contributions are maintained at low levels, said optical arrangement being positioned to direct an image onto said sensor means; and digital processing means for correcting said distortion imposed by said optical arrangement, said digital processing means being connected to said sensor means to receive said digital image data from said sensor means; wherein said optical arrangement provides front end image shaping that sacrifices distortion-free imaging to control said other aberration contributions and wherein said digital processing means provides back end image shaping to substantially correct distortion introduced by said front end image shaping.

14. The imaging system of claim 13 wherein said sensor means is a two-dimensional array of sensor elements.

15. The imaging system of claim 13 wherein said optical arrangement defines said optical properties to impose aberration levels of less than two percent with respect to astigmatism, coma and spherical aberration.

16. The imaging system of claim 13 wherein said digital processing means includes data specific to said optical properties defined by said optical arrangement.

* * * * *